United States Patent
Levit-Gurevich et al.

(10) Patent No.: US 7,865,712 B2
(45) Date of Patent: Jan. 4, 2011

(54) METHOD AND APPARATUS FOR BOOTING A PROCESSING SYSTEM

(75) Inventors: Konstantin Levit-Gurevich, Kiryatbyalik (IL); Rinat Rappoport, Haifa (IL)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 11/964,643

(22) Filed: Dec. 26, 2007

(65) Prior Publication Data

US 2010/0023739 A1    Jan. 28, 2010

(51) Int. Cl.
G06F 9/00 (2006.01)
G06F 9/24 (2006.01)
G06F 9/455 (2006.01)
G06F 11/30 (2006.01)
G06F 12/14 (2006.01)
G06F 15/177 (2006.01)

(52) U.S. Cl. .............................. 713/2; 713/1; 713/187; 713/189; 718/1

(58) Field of Classification Search ............. 713/1, 713/2, 187, 189; 718/1
See application file for complete search history.

(56) References Cited

U.S. PATENT DOCUMENTS

| 7,360,073 | B1 * | 4/2008 | Billstrom et al. ............... 713/2 |
| 2005/0055311 | A1 * | 3/2005 | Kosaki ......................... 705/51 |
| 2006/0005034 | A1 * | 1/2006 | Willman et al. ............. 713/182 |
| 2006/0179324 | A1 * | 8/2006 | Hatakeyama ............... 713/187 |
| 2006/0212691 | A1 * | 9/2006 | Wood et al. ..................... 713/1 |
| 2008/0046581 | A1 * | 2/2008 | Molina et al. ............... 709/229 |
| 2009/0172377 | A1 * | 7/2009 | Gueron et al. .................. 713/2 |

* cited by examiner

*Primary Examiner*—Mark Connolly
(74) *Attorney, Agent, or Firm*—Blakely, Sokoloff, Taylor & Zafman LLP

(57) ABSTRACT

Machine-readable media, methods, apparatus and system for booting a processing system are described. In an embodiment, whether an encrypted version of a closed operating system is authentic may be determined. The encrypted version of the closed operating system may be decrypted with a key retrieved from a processor register to provide the closed operating system, based at least in part on a determination that the encrypted version of the closed operating system is authentic. Then, whether the closed operating system is authentic may be determined and a virtual machine may be created so that the closed operating system may be launched in the virtual machine, if the closed operating system is authentic.

25 Claims, 3 Drawing Sheets

METHOD AND APPARATUS FOR BOOTING A PROCESSING SYSTEM

BACKGROUND

A virtual machine (VM) architecture logically partitions a physical machine, such that the underlying hardware of the machine is time-shared and appears as one or more independently operation virtual machines. A processing system in a virtual machine environment may comprise a virtual machine monitor (VMM) that may create a plurality of virtual machines and runs on the processing system to facilitate for other software the abstraction of one or more virtual machines. Each virtual machine may run its own operating system within itself.

The operating systems running in the virtual machines may be of two types: an open operating system and a closed operating system. The open operating system may allow a user to install and run software executing at a system privileged level. The closed operating system conversely may allow only specific usages and limit interactions with the user so that the user can not install and run software executing at the system privileged level. For example, in a closed system a user could be prevented from installing new applications or drivers, or from explicitly accessing OS services. Therefore, the closed operating system may run an application containing secrets, such as a multi-media application.

Upon a startup, a boot sequence may be used to boot the processing system, which may bring up the VMM to create one or more virtual machines. Each virtual machine may run either the open OS or the closed OS within itself.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE PREFERRED EMBODIMENTS

The following description describes techniques for booting a processing system. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
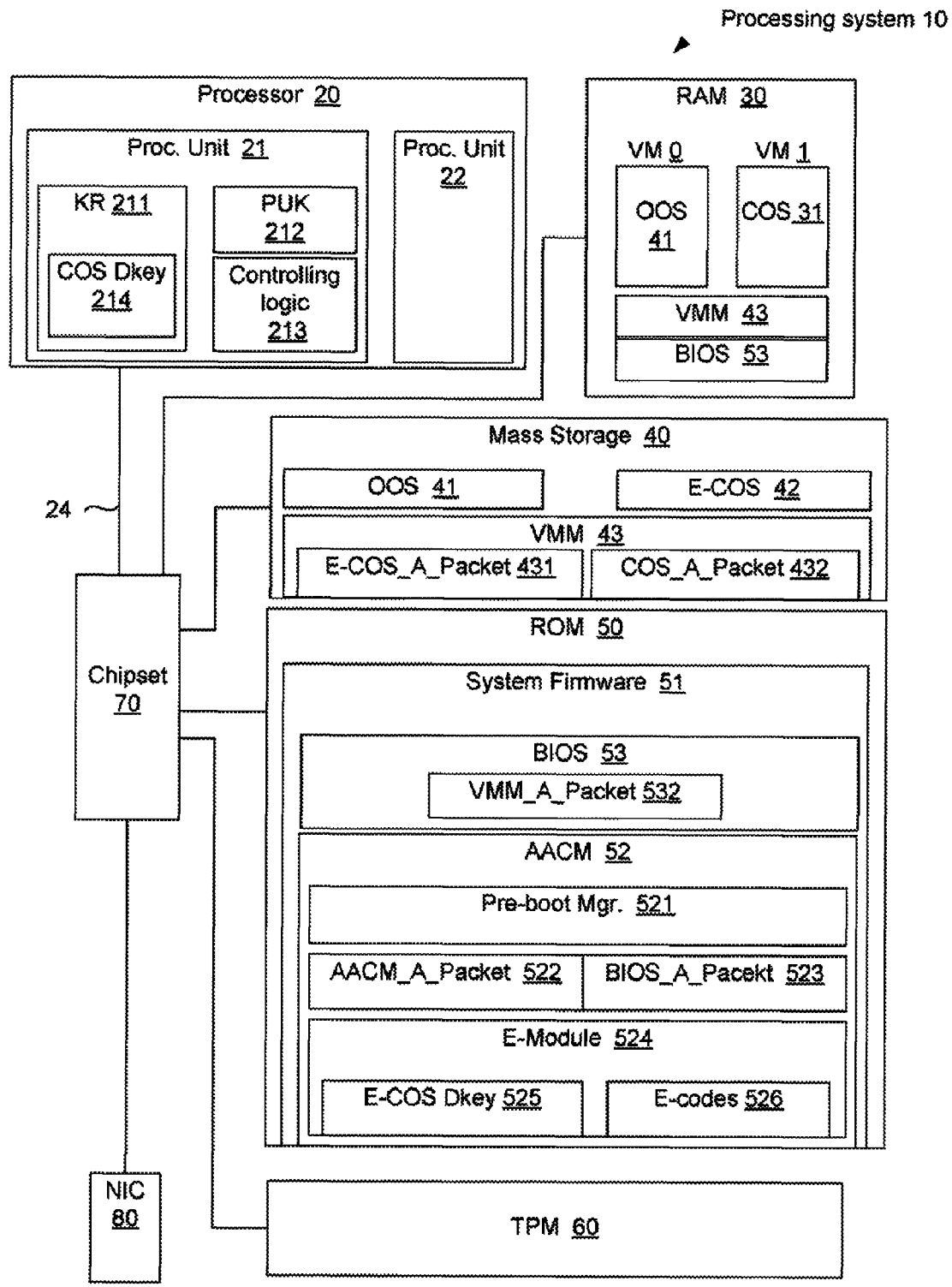
FIG. 1 illustrates an embodiment of a processing system.

FIG. 1 shows an embodiment of a processing system 10. Examples of processing system 10 may include distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 10 may comprise various hardware components, such as processor 20, communicatively coupled to various other components via one or more system buses 24 or other communication pathways or mediums. For example, processor 20 may be communicatively coupled to one or more volatile or nonvolatile data storage devices, such as RAM 30, mass storage devices 40 such as hard drives, and/or other state preserving devices or media, and read-only memory (ROM) 50. For purposes of this disclosure, the term "ROM" may be used in general to refer to nonvolatile memory devices such as programmable ROM (PROM), erasable programmable ROM (EPROM), electrically erasable programmable ROM (EEPROM), flash ROM, flash memory, etc.

Processing system 10 may further comprise a Trusted Platform Module (TPM) 60 as a security coprocessor. Processor 20, RAM 30, TPM 60, and other components may be connected to a chipset 70. Chipset 70 may include one or more bridges or hubs for communicatively coupling system components, as well as other logic and storage components. In other embodiments, other types of security coprocessors may be used, or the security processor may be omitted. Processing system 10 may be controlled, at least in part, by input from an input device, such as a keyboard, a mouse, etc., and/or by directives received from another machine, biometric feedback, or other input sources or signals. Processing system 10 may utilize one or more connections to one or more remote data processing systems, such as through a network interface controller (NIC) 80, a modem, or other communication ports or couplings.

Processor 20 may include two or more processing units, such as processing unit 21 and processing unit 22. Alternatively, a processing system may include one or more processors each with at least one processing unit. The processing units may be implemented as processing cores, as Hyper-Threading (HT) technology, or as any other suitable technology for executing multiple threads simultaneously or substantially simultaneously.

Processing unit 21 may comprise or be communicatively coupled with a key register 211, a public key (PUK) 212, and a controlling logic 213. Key register 211 may be a special internal register, e.g., a 256-bit wide register. In one embodiment, only microcodes can operate key register 211, e.g., reading/writing data or codes from/to key register 211, and no architectural instructions can implicitly operate key register 211, e.g., via the processor that operates with the microcodes, except a specific architectural instruction such as DECRYPT_AND_FLUSH which will be described in great details below. In this embodiment, the specific architectural instruction can not expose the data or codes from key register 211 to a user. In another embodiment, data or codes can not be copied from key register 211 into any other registers or memories. In another embodiment, key register 211 is an execute_once_then_flush register. More specifically, key register 211 may be flushed after the data or codes are executed once. It will be appreciated these are exemplary embodiments and embodiments may selectively incorporate various disclosed features.

In an embodiment, key register 211 may store a closed operating system decrypt key (COS Dkey) 214 used to decrypt an encrypted version of a closed operating system. PUK 212 may be a public key used to decrypt an encrypted part of an augmented authentication code module (AACM) 52 copied from system firmware 51 upon a system reset, that is, E-module 524 that may comprise an encrypted version of the COS Dkey (i.e., E-COS Dkey 525) and an encrypted version of codes operating key register 211 (i.e., E-codes 526). Although the PUK may be considered a "public" key, it may also be kept secret, such that its value is never released by processing unit 21.

Controlling logic 213 may control the usage of PUK 212 and COS Dkey 214. Further, controlling logic 213 may control the execution of codes copied from AACM 52.

Mass storage 40 may store various software images, such as open operating system (OOS) 41, an encrypted version of a closed operating system (E-COS) 42 and a virtual machine monitor (VMM) 43. The open operating system may allow a user to install and run software executing at a system privileged level. The closed operating system may allow specific usages and limit interactions with the user so that the user can not install and run software executing at the system privileged level. VMM 43 may create a plurality of virtual machines and run on the processing system to facilitate for other software the abstraction of one or more virtual machines. Examples for VMM 43 may comprise hypervisor VMM and host VMM. Hypervisor VMM may run, after launching, on top of the hardware of processing system 10 and own the entire system. Hypervisor VMM may create complete isolation between two virtual machines. Host VMM may run within a host operating system that may own the system resources and access any resources allocated for the virtual machines. In an embodiment, VMM 43 may comprise the host VMM and the host operating system.

ROM 50 may be installed with a system firmware 51 comprising AACM 52 and a basic input output system (BIOS) 53. AACM 52 may include a pre-boot manager 521 that may cause processing system 10 to authenticate BIOS image 53 before allowing BIOS 53 to run. AACM 52 may further include data packets useful for authentications of software images before allowing them to run, such as an AACM authentication packet (AACM_A_Packet) 522 for AACM authentication, and a BIOS authentication packet (BIOS_A_Packet) 523 for BIOS authentication.

In addition, AACM 52 may include the encrypted module (E-module 524) having the encrypted version of the COS DKey (E-COS Dkey 525) and the encrypted version of the codes operating key register 211 (E-codes 526), for example, codes for writing COS Dkey 214 to key register 211 and/or flushing key register 211. In an embodiment, the codes may be formed at least in part with microcodes.

In an embodiment, AACM_A_Packet 522 may include a digital signature for AACM 52 generated by an AACM private key, and an AACM public key associated with the AACM private key. Authentication may be achieved through use of the digital signature. For instance, the processor may calculate a hash of the AACM 52 and use the result to validate the signature. The processor may only initialize processor state or execute the AACM code if it passes authentication.

In an embodiment, BIOS_A_Packet 523 may include a batch bound signature (BBS), a BBS key to authenticate the BBS, and a batch identifier (BatchID) to identify a particular batch which may include a set of components or devices with each device having an ID. BBS is a digital signature associated with a batch of devices and a message, such that the signature can be authenticated by devices which belong to that batch, but the signature cannot be authenticated by devices which do not belong to that batch. For example, a BBS on a message M, which is bound to a batch identified by BatchID, may be implemented as a signature on M||BatchID (where "||" denotes concatenation). In an embodiment, the above devices may be processors.

Also, "batch bound authentication" (BBA) is the process of authenticating a BBS. When a device whose ID equals X performs BBA on an input BBS, the device may perform a procedure that consists of authenticating the message and verifying that X is in the associated batch. For purposes of this disclosure, the "message manager" is the entity that provides the message that needs to be authenticated by the device, and the "batch manager" is the entity that provides the BatchID.

A variety of different techniques may be used for creating and authenticating BBS.

Shared-Secret-Based BBA

One approach may use a message authentication code (MAC) such as a hashed message authentication code (HMAC) which has the form $$HMAC_K(m)=h((K \text{ xor opad})||h((K \text{ xor ipad})||m))$$

where m is the message or data to be protected, h is the hashing function, K is a platform key (e.g., a key stored in TPM 60), ipad is a predefined inner pad constant, and opad is a predefined outer pad constant.

For instance, an Original Equipment Manufacturer (OEM) may compute a hash (H) of the approved BIOS image for a processing system. The OEM may also acquire a BatchID to cover the processor (or processors) having an identifier X for the processing system from a batch manager (e.g., from a processor manufacturer). The OEM may then use a secret key "SKey" to generate BBS=HMAC(H||BatchID), using any suitable HMAC algorithm. The OEM may then send SKey, BBS, and BatchID to the batch manager (e.g., the processor manufacturer), as indicated above. The SKey may serve as the BBS Key.

The processor manufacturer may then create a data module (e.g., an AACM) that facilitates secure loading of SKey (and optionally BatchID) into a device such as a processor. In an embodiment, that data module is loaded into the processor dynamically, such as on reset. In an alternative embodiment, that data module may be loaded into the processor permanently.

When the processor manufacturer receives SKey, BBS, and BatchID from the OEM, the processor manufacturer may first verify that BatchID matches a batch assigned to that OEM. The processor manufacturer may then embed BIOS_A_Packet 523 having the SKey, BBS, and BatchID into AACM module 52. The processor manufacturer may also load pre-boot manager 521 into AACM 52. The processor manufacturer may then send AACM 52 to the OEM.

The OEM may install the AACM in the computer system, along with a processor with the identifier "X" belonging to BatchID. As indicated above, the AACM may include the BBS. The OEM may then ship the computer system to a user.

After the AACM has been installed, boot processes for the processing system may involve processor X performing BBA, using the SKey and the HMAC algorithm. For example, processor 20 may load and run pre-boot manager 521 from AACM 52. Pre-boot manager 521 may then determine whether X is in BatchID. Pre-boot manager 521 may also compute a hash (H') of the current BIOS image 53 in the computer system. Pre-boot manager 521 may then use the BBS Key, BatchID, and H' to compute BBS'=HMAC(H'||BID). Pre-boot manager 521 may then compare BBS' against the BBS from BIOS_A_Packet 523. If X is in the BatchID and BBS' matches BBS, pre-boot manager 521 may conclude that the BBA was successful, and may therefore allow BIOS 53 to proceed a boot process. Otherwise, pre-boot manager 521 may displaying, logging, and/or transmitting an appropriate error message.

Public-Key-Based BBA

An alternative method for creating and authenticating BBSs may be based on public keys. For instance, as for the process described above, an OEM may compute a hash "H" of the approved BIOS image for a computer system, acquire a BatchID from the processor manufacturer, and then send H and BatchID to the processor manufacturer. The processor manufacturer may then verify that BatchID belongs to a batch provided to that OEM. After successful verification, the processor manufacturer may compute a signed message "MSigned"=PublicKeySign(H||BatchID), using the processor manufacturer's private key "PrivKey." In this approach, batch managers may use RSA or any other suitable public key scheme to compute MSigned. The processor manufacturer may then embed BIOS_A_Packet 523 having the corresponding public key "PubKey," MSigned, and BatchID in AACM 52, which is returned to the OEM. Consequently, PubKey serves as the BBS Key, and MSigned serves as the BBS.

The OEM then embeds AACM 52 in the processing system with a processor from BatchID and ships the processing system to a user. Thereafter, when the processing system is started or reset, the processor loads AACM 52 and runs pre-boot manager 521 from the AACM prior to jumping to the BIOS code. When pre-boot manager 521 runs, it may verify that the identifier for the current processor is in BatchID. Pre-boot manager 521 may also compute a hash (H') of the current BIOS image, and may use PubKey to compute M=PublicKeyDecrypt(MSigned). Pre-boot manager 521 may then compare H'||BatchID against M. Upon successful completion of the above operations, pre-boot manager 521 may conclude that the BBA was successful, and may therefore allow BIOS 53 to proceed the boot process. Otherwise, pre-boot manager 521 may display, log, and/or transmit an appropriate error message.

Although the embodiments of authenticating AACM 52 and BIOS 53 have been described above, it should be appreciated that other technologies may be applied for authentication which should fall into the scope defined by the attached claims. For example, similar technology for authenticating BIOS 53 may be used to authenticate AACM 52. For another example, similar technology for authenticating BIOS 53 may be used to authenticate AACM 52.

E-module 524 of AACM 52 may be decrypted by PUK 212 from processor 20, to provide COS Dkey 214 and the codes operating key register 211. In an embodiment, E-module 524 may be decrypted upon the processing system is reset and AACM 52 are copied to an internal memory of processor 21. In an alternative embodiment, E-module 524 may be decrypted further upon AACM 52 is determined to be authentic by processor 21, for example, by using AACM_A_Packet 522. The codes operating key register 211 may copy COS Dkey 214 to key register 211 upon AACM 52 is determined to be authentic and thus executed by processor 21. Alternatively, the codes may copy COS Dkey 214 to key register 211 further upon pre-boot manager 521 determines that BIOS 53 is authentic, for example, by using BIOS_A_Packet 523.

BIOS 53 may test and prepare the processing system 10 for operation by querying its configuration settings. BIOS 53 may then load an operating system (e.g., the open operating system or the closed operating system) and pass control to it. Besides a boot sequence, BIOS 53 may further function to control device drivers, for example it may request from the drivers as well as the application programs.

BIOS 53 may comprise a VMM authentication packet (VMM_A_Packet) 531 to authenticate VMM 43 before launching VMM 43. In order to ensure a secured boot of the closed OS, for example, to ensure that the encrypted version of the closed OS and/or the closed OS has not been modified by an attacker prior to booting the closed OS, VMM 43 may further comprise an E-COS authentication packet (E-COS_A_Packet) 431 to authenticate the encrypted version of the closed OS (E-COS 42) and/or a COS authentication packet (COS_A_Packet) 432 to authenticate the closed OS. Many technologies may be adopted to perform the authentications, for example, the technology similar with that for authenticating the AACM or the technology similar with that for authenticating the BIOS, as stated above.

In an embodiment, upon a system reset, processor 21 may flush key register 211. Processor 21 may further copy AACM 52 from ROM 50 to its internal memory and authenticate AACM 52 (e.g., to determine whether AACM 52 has been modified by an attacker or not), for example, by using AACM_A_Packet 522. In response that AACM 52 is authentic, processor 21 may use PUK 212 to decrypt E-module 524 of AACM 52 to provide COS Dkey 214 and the codes operating key register 211. In response that AACM is not authentic, processor 21 may flush key register 211 and stop the process without processing system 10 booting. Alternatively, processor 21 may flush key register 211 and initiate a non-ACM boot by jumping to BIOS codes.

Upon the determination that AACM 52 is authentic, processor 21 may jump to AACM 52 so that AACM 52 may execute pre-boot codes to copy COS Dkey 214 to key register 211 and authenticate system BIOS 53 (e.g., to determine whether BIOS 53 has been modified by an attacker or not), for example, by using BIOS_A_Packet 523. In an embodiment, COS Dkey 214 may be copied to key register 211 before authenticating BIOS 53. In an alternative embodiment, COS Dkey 214 may be copied to key register 211 after BIOS 53 is determined to be authentic.

In response that BIOS 53 is authentic, processor 21 may jump to the BIOS code for the system boot. In response that BIOS 52 is not authentic, AACM 52 may flush key register

211 with the codes operating key register 211 and stop the process without processing system 10 booting. Alternatively, AACM 52 may flush key register 211 and allow the BIOS to perform regular sequences.

During the system boot, BIOS 53 may authenticate VMM 43 (e.g., to determine whether VMM 43 has been modified by an attacker or not), for example, by using VMM_A_Packet 531. In response that VMM 43 is not authentic, BIOS 53 may instruct processor 21 to flush key register 211 and stop the process without processing system 10 booting. Alternatively, BIOS 53 may flush key register 211 and allow VMM 43 to perform regular sequences.

In an embodiment, BIOS 53 may flush key register by using an instruction DECRYPT_AND_FLUSH. DECRYPT_AND_FLUSH is a specific architectural instruction that may operate the value from key register 211 without exposing the value to a user. In an embodiment, operand of the instruction may include NUM XXXX/YYYY respectively representing NUM=number of bits read from key register 211, XXXX=a memory location of an encrypted text and YYYY=a memory location of a decrypted text. For example, DECRYPT_AND_FLUSH with NUM=0 may be a flush instruction to flush key register 211. For another example, DECRYPT_AND_FLUSH with NUM=a (a≠0) may instruct to decrypt an encrypted text having NUM bits starting from the memory location XXXX and store the decrypted text to the memory location YYYY, and then flush key register 211.

In response that VMM 43 is authentic, BIOS 53 may launch VMM 43 in RAM 30. Then, VMM 43 may authenticate E-COS 42 (e.g., to determine whether E-COS 42 has been modified by an attacker or not), for example, by using E-COS_A_Packet 431. In response that E-COS 42 is not authentic, VMM 43 may flush key register 211, for example, by using the DECRYPT_AND_FLUSH instruction with NUM=0, and stop the process without processing system 10 booting. Alternatively, VMM 43 may flush key register 211 and create a virtual machine (VM 0) and run the open operating system (OOS 41) in the virtual machine.

In response that E-COS 42 is authentic, VMM 43 may issue an instruction, for example, the DECRYPT_AND_FLUSH instruction with NUM≠0 to decrypt E-COS 42. Upon receiving the instruction, processor 21 may read COS Dkey 214 from key register 211, use COS Dkey 214 to decrypt E-COS 42 and flush key register 211. Then, VMM 43 may authenticate the decrypted closed operating system (COS 31) (e.g., to determine whether COS 31 has been modified by an attacker or not), for example, by using COS_A_Packet 432.

In response that COS 31 is authentic, VMM 43 may create a virtual machine (VM 1) and run COS 31 in VM 1. VMM 43 may further create another virtual machine (VM 0) and run the open operating system (OOS 41) in VM 0. However, in response that COS 31 is not authentic, VMM 43 may stop the process without processing system 10 booting. Alternatively, VMM 43 may create a virtual machine (VM 0) and run the open operating system (OOS 41) in the virtual machine.

Many technologies may implement other embodiments of processing system 10. In an embodiment, AACM 52 may further store an encrypted version of a platform key specific to an OEM of processing system 10. The same platform key may be stored in TPM 60 when manufacturing the processing system. Upon the system reset, processor 21 may decrypt the encrypted version of the platform key with a processor key and install the platform key into a processor register so that a secured session may be built between the processor and TPM through the platform key. In another embodiment, pre-boot manager 521 may be formed at least in part with microcodes and enclosed within AACM 52 in an encrypted version. In that case, processor 21 may decrypt the encrypted version of pre-boot manager 521 before executing the microcodes. In another embodiment, one or more of the above-stated authentications may be modified or omitted, for example, the AACM authentication may be omitted so that the AACM module may be deemed as authentic automatically.

It will be appreciated these are exemplary embodiments and embodiments may selectively incorporate various disclosed features.

Figure 2:
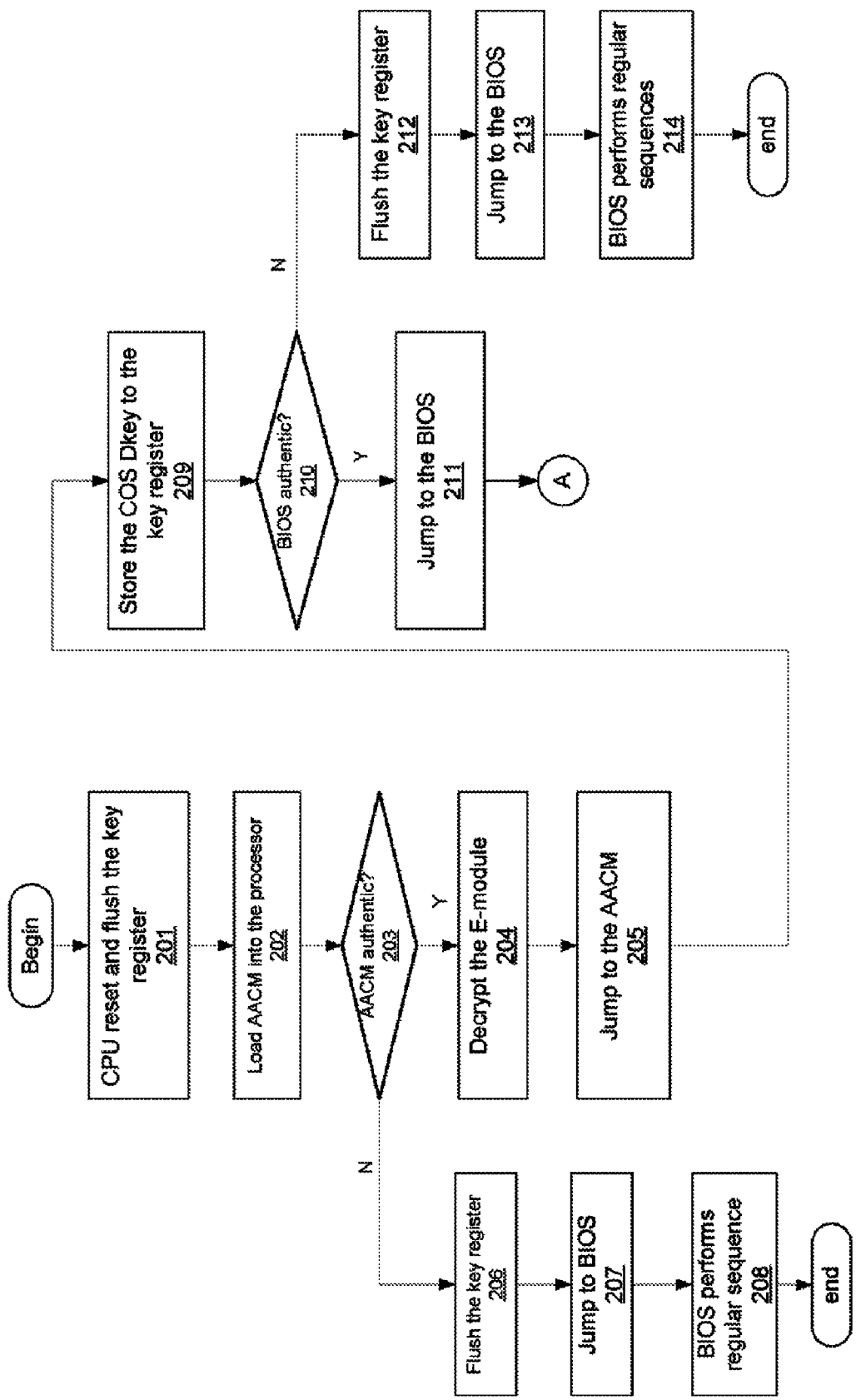
FIG. 2 and FIG. 3 illustrate an embodiment of a method of booting the processing system.
Figure 3:
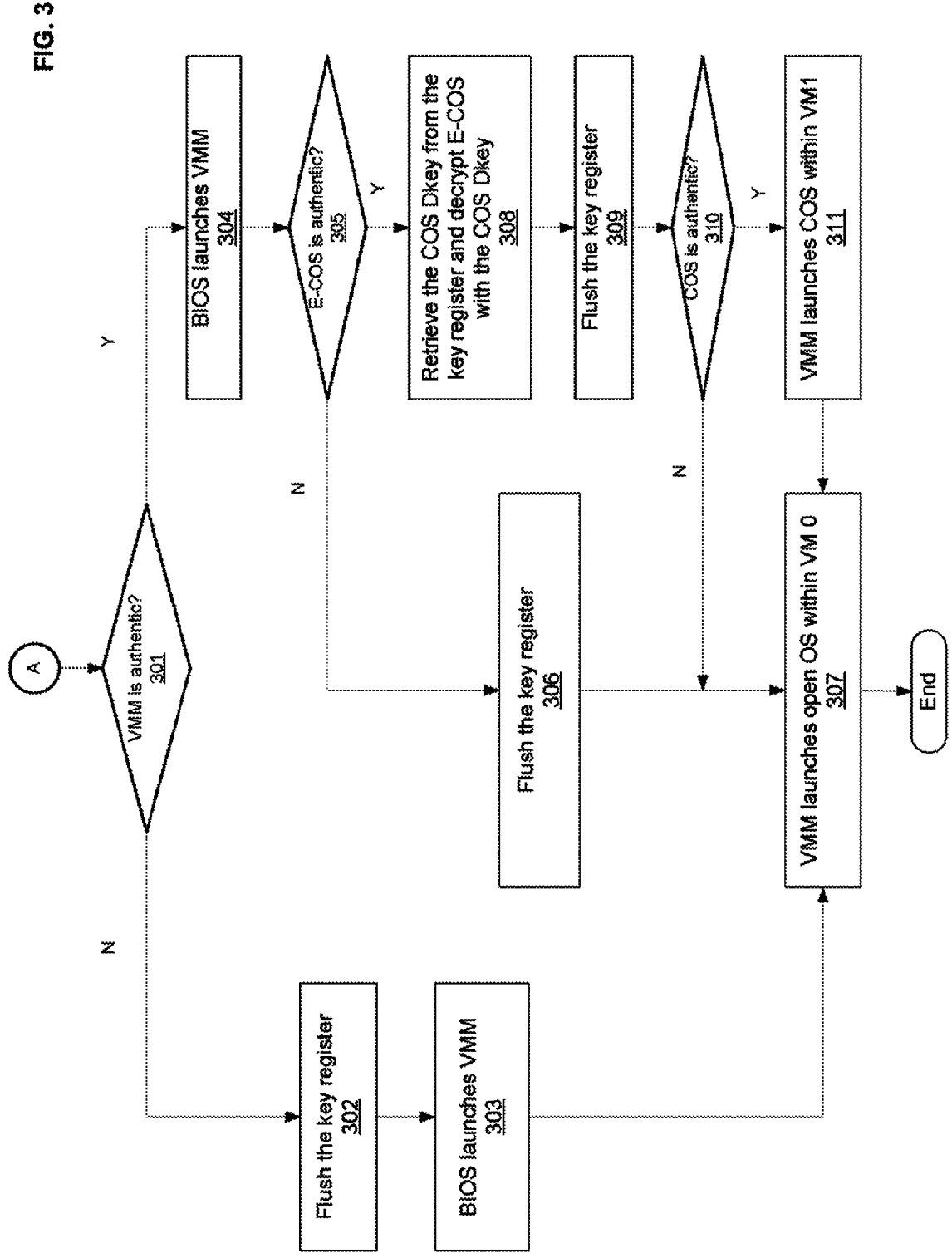

FIGS. 2 and 3 illustrate an embodiment of a method of booting the processing system. In block 201, upon a system reset, processor 21 may flush key register 211. In block 202, processor 21 may load AACM 52 to its internal memory. In block 203, processor 21 may determine whether AACM 52 is authentic, for example, by using AACM_A_Packet 522. In response that AACM 52 is not authentic, processor 21 may optionally flush key register 211 in block 206. In block 207, processor 21 may initiate a non-ACM boot, namely, jump to BIOS codes 53 without executing the pre-boot codes so that BIOS 53 may perform its regular sequence to boot processing system 10 in block 208. Alternatively, processor 21 may determine if non-ACM boot is allowed and jump to BIOS codes 53 if non-ACM boot is allowed, otherwise the process may end without processing system 10 booting.

In response that AACM 52 is authentic, processor 21 may retrieve E-module 524 comprising E-COS Dkey 525 and E-codes 526 from AACM 52 and decrypt E-module 524 with PUK 213 to provide COS Dkey 214 and codes operating key register 211 in block 204. Then, processor 21 may jump to the AACM codes in block 205.

In block 209, the codes operating key register 211 may copy COS Dkey 214 to key register 211. In block 210, pre-boot manager 521 may determine whether BIOS 53 is authentic, for example, by using BIOS_A_Packet 523. In response that BIOS 53 is authentic, pre-boot manager 521 may jump to BIOS codes to proceed the boot process in block 211, otherwise, the codes operating key register 211 may flush key register 211 in block 212 and jump to BIOS codes in block 213 so that BIOS 53 may perform its regular sequence to boot processing system 10 in block 214. Alternatively, pre-boot manager 521 may stop the process without processing system 10 booting.

In block 301, BIOS 53 may determine whether VMM 43 is authentic, for example, by using VMM_A_Packet 531. In response that VMM 43 is not authentic, BIOS 53 may flush key register 211 in block 302, for example, by using DECRYPT_AND_FLUSH instruction with NUM=0. In block 303, BIOS 53 may launch VMM 43 in block 303 so that VMM 43 may create a virtual machine (VM 0) and run open OS 41 in VM 0. Alternatively, VMM 43 may stop the process without processing system 10 booting, for example, by shutting down processing system 10.

In response that VMM 43 is authentic, BIOS 53 may launch VMM 43 in block 304. Then, VMM 43 may determine whether E-COS 42 is authentic, for example, by using E-COS_A_Packet 431, in block 305. In response that E-COS is not authentic, VMM 43 may issue an instruction, for example, DECRYPT_AND_FLUSH NUM=0 instruction, to flush key register 211 in block 306. In block 307, VMM 43 may create a virtual machine (VM 0) and run open OS 41 in VM 0. Alternatively, BIOS 53 may stop the process without processing system 10 booting, for example, by shutting down processing system 10.

In response that E-COS 42 is authentic, VMM 43 may issue an instruction to instruct processor 21 to read COS Dkey 214 from key register 211 and decrypt E-COS 42 with COS Dkey 214 to provide the closed OS (COS 31) in block 308. In block

309, VMM 43 may instruct processor 21 to flush key register 211. In an embodiment, VMM 43 may use the above-stated DECRYPT_AND_FLUSH NUM XXXX/YYYY instruction for those operations. In block 310, VMM 43 may determine whether COS 31 is authentic, for example, by using COS_A-_Packet 432.

In response that COS 31 is authentic, VMM 43 may create a virtual machine (VM 1) and run COS 31 in VM 1 in block 311. Optionally, VMM 43 may further create a virtual machine (VM 0) and run OSS 41 in VM 0.

In response that COS 31 is not authentic, VMM 43 may create VM 0 and run open OS 41 in VM 0, in block 307. Alternatively, VMM 43 may stop the process without processing system 10 booting, for example, by shutting down processing system 10.

Many technologies may implement other embodiments for the method of booting processing system 10. In an embodiment, processor 21 may store COS Dkey 214 in key register 211 upon a determination that BIOS 53 is authentic. In another embodiment, the process may omit some blocks for key register 211 flushing, for example, block 206.

Although the current invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A method, comprising:
   determining whether an encrypted version of a closed operating system is authentic;
   decrypting the encrypted version of the closed operating system with a key retrieved from a processor register to provide the closed operating system, based at least in part on a determination that the encrypted version of the closed operating system is authentic;
   determining whether the closed operating system is authentic; and
   creating a virtual machine and launching the closed operating system in the virtual machine, if the closed operating system is authentic.

2. The method of claim 1, further comprising flushing the processor register after decrypting the encrypted version of the closed operating system.

3. The method of claim 1, further comprising flushing the processor register if the encrypted version of the closed operating system is not authentic.

4. The method of claim 1, further comprising creating another virtual machine and launching an open operating system in the another virtual machine.

5. A system, comprising:
   a processor;
   an augmented authentication code module responsive to the processor; and
   a boot module responsive to the processor, wherein
   the processor further comprises:
      a first key to decrypt an encrypted version of a second key to provide the second key; and
      a key register;
   the augmented authentication code module further comprises instructions that if executed by the processor, cause the system to:
      determine whether the boot module is authentic; and
      store the second key into the key register if the boot module is authentic; and
   the boot module further comprises instructions that if executed by the processor, cause the system to:
      determine whether a virtual machine monitor is authentic; and
      flush the key register if the virtual machine monitor is not authentic.

6. The system of claim 5, further comprising a virtual machine monitor responsive to the processor, wherein the virtual machine monitor further comprises instructions that if executed by the processor, cause the system to:
   determine whether an encrypted version of a closed operating system is authentic;
   decrypt the encrypted version of the closed operating system with the second key retrieved from the key register to provide the closed operating system, if the encrypted version of the closed operating system is authentic; and
   determine whether the closed operating system is authentic; and
   create a virtual machine and launch the closed operating system in the virtual machine, if the closed operating system is authentic.

7. The system of claim 6, wherein the virtual machine monitor further comprises instructions that if executed by the processor, cause the system to flush the key register if the encrypted version of the closed operating system is not authentic.

8. The system of claim 6, wherein the virtual machine monitor further comprises instructions that if executed by the processor, cause the system to create another virtual machine and launch an open operating system in the another virtual machine.

9. The system of claim 6, wherein the virtual machine monitor further comprises instructions that if executed by the processor, cause the system to flush the key register after decrypting the encrypted version of the closed operating system.

10. The system of claim 5, wherein the key register is flushed upon a processor reset.

11. The system of claim 5, wherein the processor further comprises a controlling logic to determine whether the augmented authentication code module is authentic.

12. The system of claim 11, wherein the first key is further to decrypt the encrypted version of the second key if the augmented authentication code module is authentic.

13. The system of claim 5, wherein the key register is an execute_once_then_flush register.

14. The system of claim 5, wherein the second key can not be exposed to a user.

15. The system of claim 5, wherein the second key can not be copied from the key register to a memory or another register.

16. A system, comprising:
   a processor;
   an augmented authentication code module responsive to the processor; and
   a boot module responsive to the processor, wherein
   the processor further comprises:
      a first key to decrypt an encrypted version of a second key to provide the second key; and
      a key register;
   the augmented authentication code module further comprises instructions that if executed by the processor, cause the system to:
      store the second key into the key register;
      determine whether the boot module is authentic; and
      flush the key register if the boot module is not authentic; and the boot module further comprises instructions that if executed by the processor, cause the system to:
- determine whether a virtual machine monitor is authentic; and
- flush the key register if the virtual machine monitor is not authentic.

17. The system of claim 16, further comprising a virtual machine monitor responsive to the processor, wherein the virtual machine monitor further comprises instructions that if executed by the processor, cause the system to:
- determine whether an encrypted version of a closed operating system is authentic;
- decrypt the encrypted version of the closed operating system with the second key retrieved from the key register to provide the closed operating system, if the encrypted version of the closed operating system is authentic;
- determine whether the closed operating system is authentic; and
- create a virtual machine and launch the closed operating system in the virtual machine if the closed operating system is authentic.

18. The system of claim 17, wherein the virtual machine monitor further comprises instructions that if executed by the processor, cause the system to flush the key register if the encrypted version of the closed operating system is not authentic.

19. The system of claim 17, wherein the virtual machine monitor further comprises instructions that if executed by the processor, cause the system to create another virtual machine and launching an open operating system in the another virtual machine.

20. The system of claim 17, wherein the virtual machine monitor further comprises instructions that if executed by the processor, cause the system to flush the key register after decrypting the encrypted version of the closed operating system.

21. The system of claim 16, wherein the key register is flushed upon a processor reset.

22. The system of claim 16, wherein the processor further comprises a controlling logic to determine whether the module is authentic.

23. The system of claim 22, wherein the first key is further to decrypt the encrypted version of the second key if the augmented authentication code module is authentic.

24. The system of claim 16, wherein the key register is an execute_once_then_flush register.

25. The system of claim 16, wherein the second key can not be copied from the key register to a memory or another register.

* * * * *